May 28, 1963 W. H. SNOW 3,091,691
AORTOGRAPHIC MULTIPLE CASSETTE CHAMBER
Filed Aug. 15, 1960 3 Sheets-Sheet 1
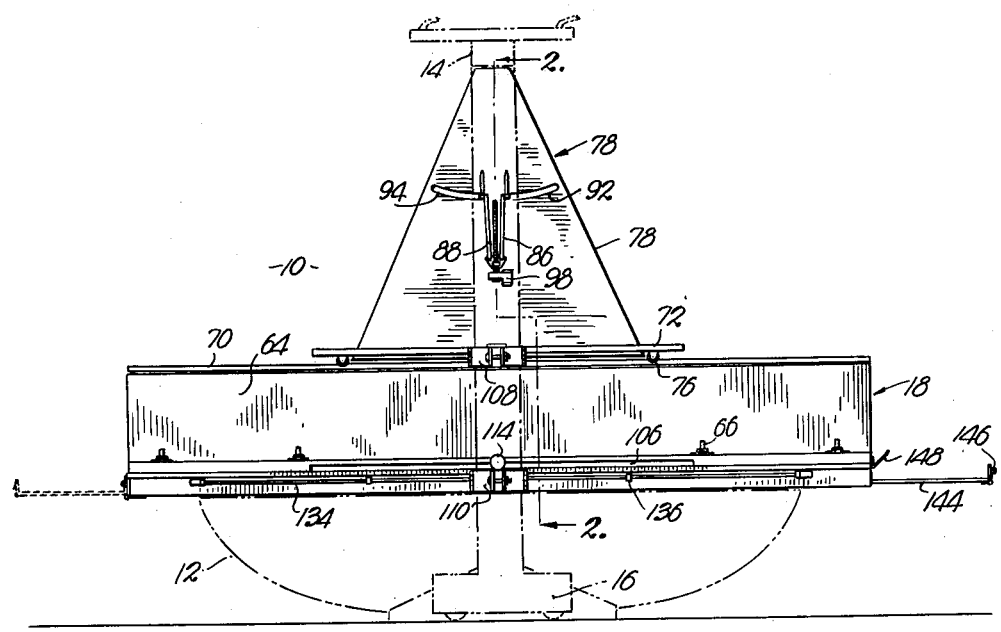
Fig. 1.
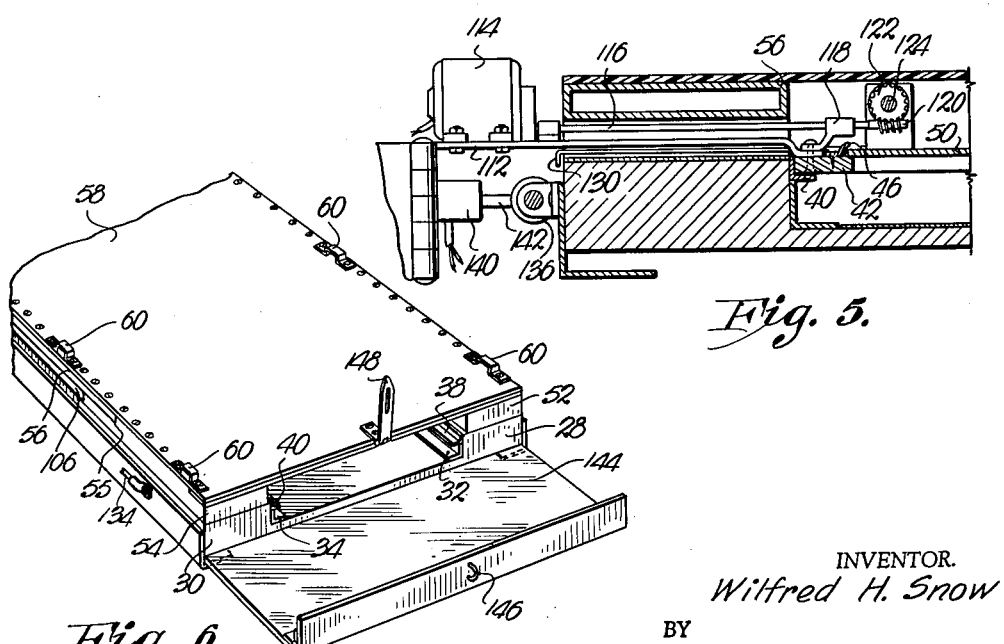
Fig. 5.
Fig. 6.
INVENTOR.
Wilfred H. Snow
BY
ATTORNEYS.

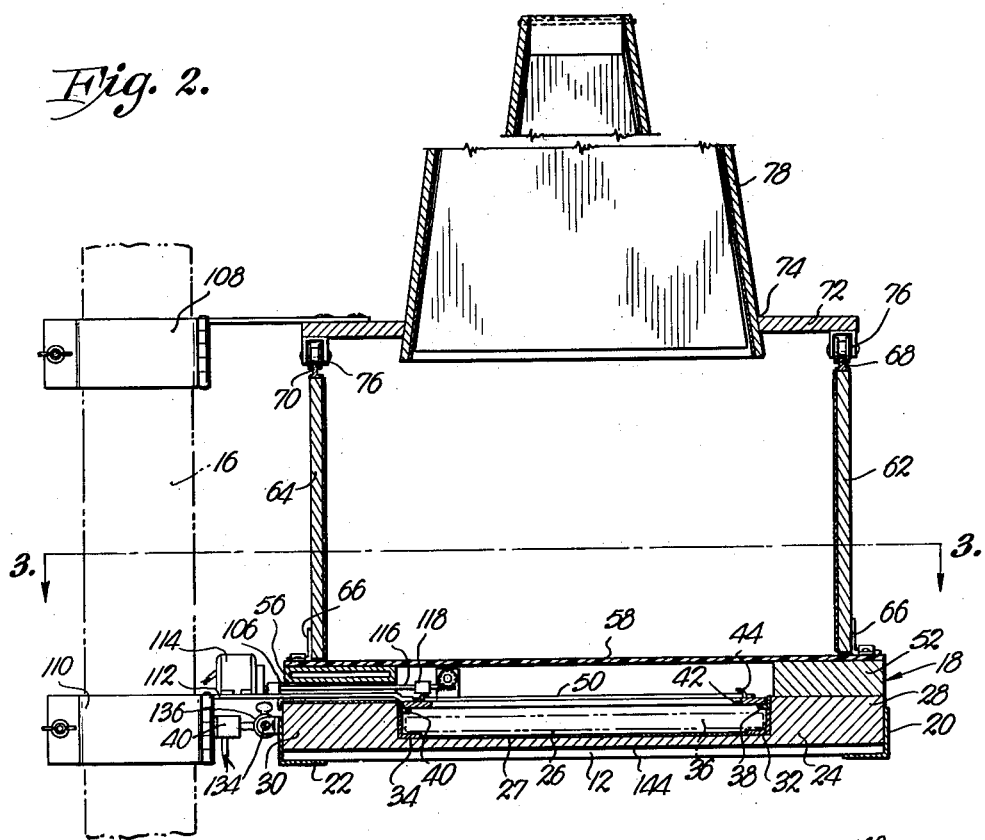
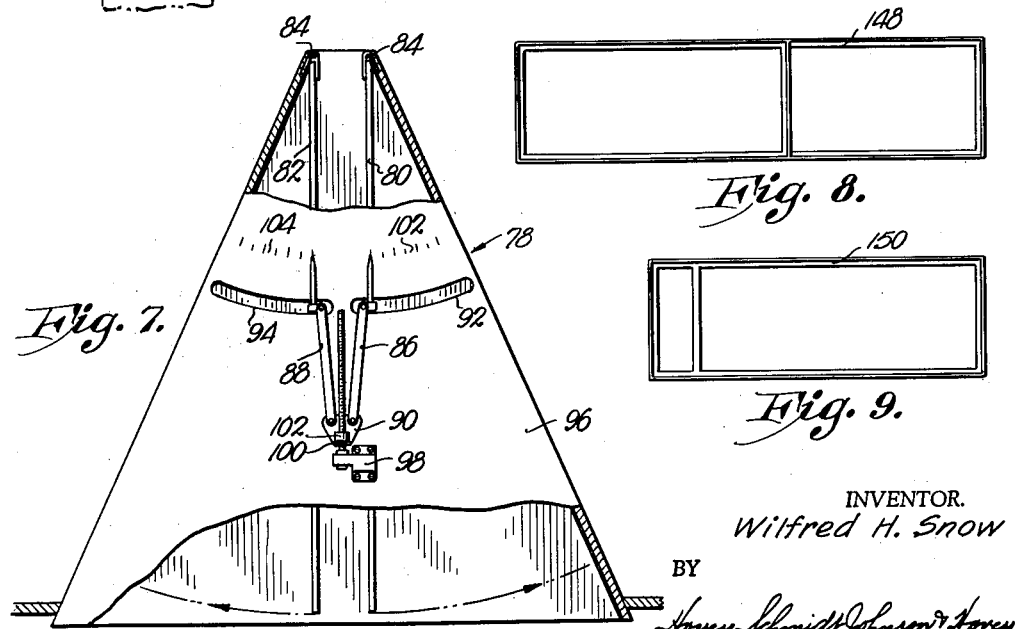

May 28, 1963 W. H. SNOW 3,091,691
AORTOGRAPHIC MULTIPLE CASSETTE CHAMBER
Filed Aug. 15, 1960 3 Sheets-Sheet 3
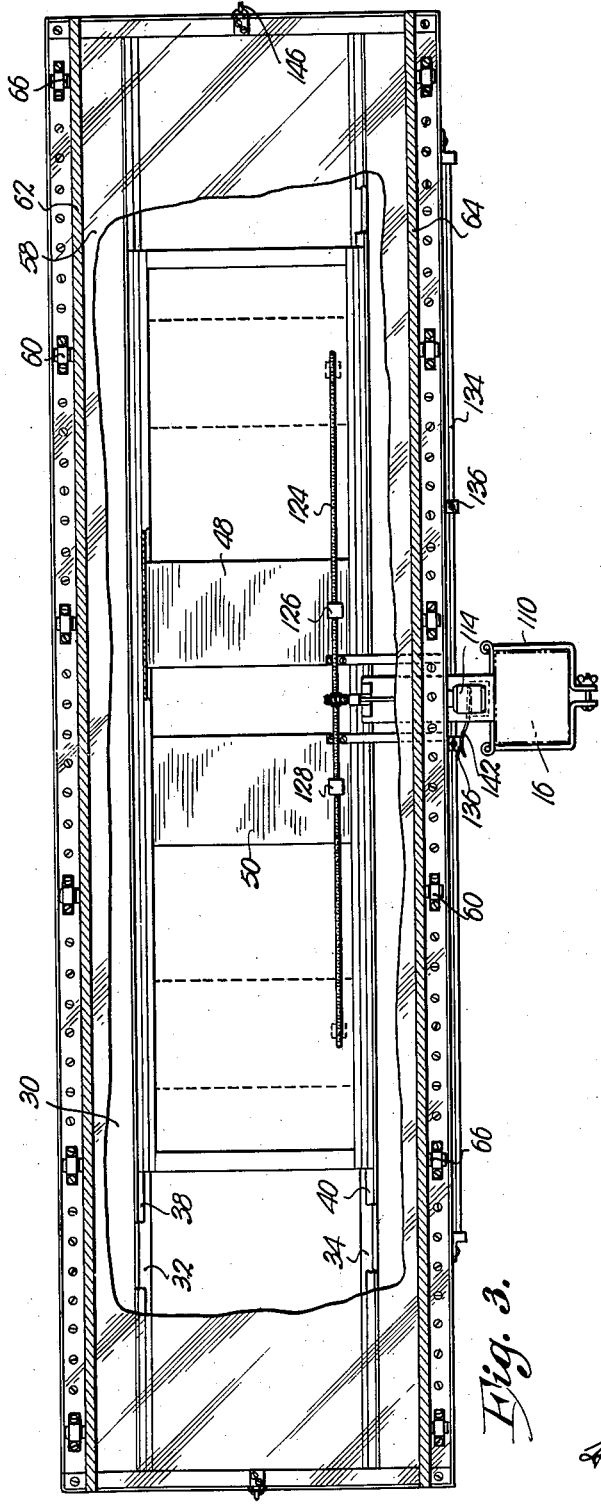
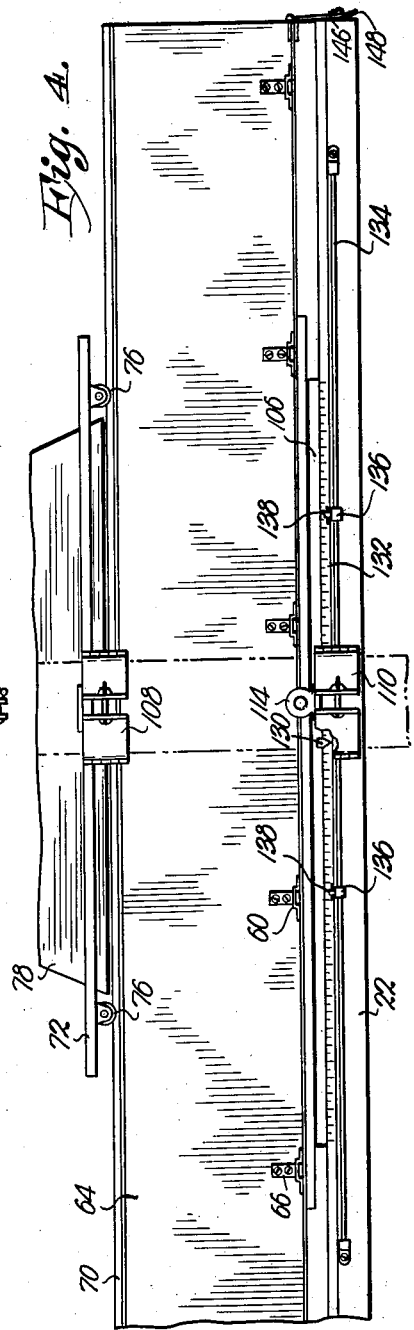
INVENTOR.
Wilfred H. Snow
BY
ATTORNEYS.

United States Patent Office 3,091,691
Patented May 28, 1963

3,091,691
AORTOGRAPHIC MULTIPLE CASSETTE
CHAMBER
Wilfred H. Snow, 222 Spruce, Leavenworth, Kans.
Filed Aug. 15, 1960, Ser. No. 49,690
8 Claims. (Cl. 250—58)

The present invention relates to a multiple aortographic cassette chamber for an X-ray machine and more particularly to an X-ray machine of the variety having a shiftable table and an X-ray source supported thereover wherein means are provided which are coupled with said table for shiftably supporting a plurality of X-ray film-carrying cassettes which are available for immediate use.

During the taking of aortograms, the time factor involved is of great importance because of the short period in which the contrast media is present in the blood stream within the aorta. The dye passes very rapidly through the aorta and the radiographs, several of which are generally required, must be taken while such dye is present within the artery. Thus, in order to lessen the time involved in taking radiograms of the aorta, it is extremely important that a plurality of X-ray films be available for instant use. Prior devices utilizing film plates carried in single cassettes were not satisfactory because of the necessity of placing individual film plates in proper position on the X-ray table for exposure purposes. Therefore, it is the primary object of this invention to overcome the defects noted above and to provide a number of X-ray film plates in unique disposition, permitting taking of several radiographs in an interval of only a few seconds and during the period that the contrast medium is present in the aorta.

The present invention proposes to provide an X-ray machine accessory wherein a trough is provided coupled with said table wherein a plurality of X-ray film-carrying cassettes may be inserted and the same shifted manually by the insertion of a fresh cassette at one end of the trough abutting the next, and so on down the line to move all of the cassettes present in the trough which are in abutting relationship.

It is, therefore, an object of the present invention to provide an X-ray machine accessory for supporting a plurality of X-ray film-carrying cassettes such that an X-ray source passed over the table and the accessory in its course of travel may quickly take a plurality of X-ray pictures, or wherein the X-ray source may be fixed and a succession of cassettes passed thereunder by virtue of continually inserting a fresh film-carrying cassette in one end of the means abutting the cassette previously inserted and shoving the same along the trough so that by this simple expedient, the machine operator is permitted to take a large number of pictures in sequence, of the same area of the person or thing being X-rayed.

It is another object of the present invention to provide an X-ray machine of the type above described wherein is provided a pair of trough flanges intermediate the trough bottom and the X-ray source, the flanges supporting a pair of nonpenetrable, movable X-ray shields whereby said X-ray source is prevented from exposing a greater area than desired.

It is still another object of the present invention to provide in a machine of the type above described, exposure area limiting means coupled with said X-ray source to travel or be fixed therewith for limiting the exposure area of the X-ray source.

It is still another object of the present invention to provide in X-ray area limiting means of the type mentioned above, selectively positionable diaphragm means for variably setting the exposure area of the X-ray source.

It is still another object of the present invention to provide in an X-ray machine of the type above described, a pair of easily removable, elongated side walls which are radiation-protective and are adapted to be coupled with the side edges of the means for supporting the plurality of cassettes and extending upwardly therefrom, the side walls forming a protective shield for the operator of the X-ray unit and forming a chamber wherein the patient or object to be X-rayed may lie.

It is still another object of the present invention to provide a machine of the type described above, wherein the exposure area limiting means is adapted to engage said side walls to be supported thereby, the engagement being movable to permit the exposure area limiting means to move with the X-ray source.

It is still another object of the present invention to provide in apparatus of the type above described, adjustable shutters coupled with the means for supporting the cassettes for masking areas of film from exposure, said apparatus being further provided with means coupled with the source for tripping the source at pre-selected intervals to emit X-rays as desired.

Further objects and advantages of the present invention too numerous to be separately included, will appear from the specification as this application proceeds and are intended to be covered by the appended claims. Further, various changes and modifications may be made to the structure of the present invention without departing from the spirit thereof and are also intended to be covered by the scope of the appended claims.

In the drawings:

FIGURE 1 is a side elevational view of the structure of the present invention shown as applied to a typical X-ray unit indicated in dotted lines;

FIG. 2 is a vertical, cross-sectional view through the invention taken on line 2—2 of FIG. 1;

FIG. 3 is a view taken along line 3—3 of FIG. 2, looking in the direction of the arrows and with portions broken away to show details of construction;

FIG. 4 is a side elevational view of a portion of the invention shown in FIG. 1 with parts broken away to show details of construction and particularly indicating details of an adjustable shutter device;

FIG. 5 is an enlarged view partially in side elevation and partially in cross section showing further details of the shutter device;

FIG. 6 is a perspective view of a portion of the present invention showing certain details of construction;

FIG. 7 is a view partly in side elevation and partly in section showing details of construction of an exposure area limiting pyramid-segment;

FIG. 8 is a top plan view of a film-carrying cassette of a type used in the present invention; and FIG. 9 is a top plan view of a second type of film-carrying cassette for use with the present invention.

Referring now to the drawings and particularly to FIG. 1, an X-ray unit is shown generally identifiable by the numeral 10 and consisting specifically of a table 12, an X-ray source 14 and a movable support 16. It should be noted that the movable support 16 is coupled with the X-ray source 14 and supports the latter in overlying relationship to table 12, and further, that the support 16 and source 14 are movable relative to table 12.

Means coupled with said table for shiftably supporting a plurality of X-ray film-carrying cassettes are generally identified by the numeral 18 and by particularly referring to FIG. 2 it can be seen that the supporting means are supported on table 12 and held in aligned relationship thereon by a pair of angle iron flange members 20 and 22. Means 18 consists of a bottom member 24 supported on table 12 within angle irons 20 and 22. A central trough 26 is formed in member 24 and is provided with a lining 27 of lead or other X-ray impenetrable material. Member 24 is provided with a pair of elongated, upstanding side bars 28 and 30 flanking trough 26 throughout the length of member 24. Trough 26 extends centrally throughout the entire length of member 24, and, as can be seen particularly well in FIG. 6, the trough is open at each end. At each side of trough 26 there is an L-shaped, elongated side flange 32 and 34 respectively, said flanges extending the length of trough 26 and intended to slidably support an X-ray film-carrying cassette 36 as indicated in dotted lines in FIG. 2.

Track flanges 38 and 40 are secured to the side bars 28 and 30 of member 24 respectively, intermediate the bottom of trough 26 and the upper surface of member 24, the same extending the length of trough 26 for receiving and supporting a frame 42. A pair of elongated side tabs 44 and 46 are carried by frame 42 and extend the length of trough 26. It will be noted that tabs 44 and 46 are constructed and arranged to provide a way between tabs 44 and 46 and frame 42 wherein may be carried a plurality of X-ray-impenetrable sliding shutters such as the pair 48 and 50 shown in FIG. 3 of the drawings.

Suported on side bar 28 in any suitable manner, is an elongated wooden support beam 52. Extending from each end of side bar 30 toward the center thereof are a pair of wooden block supports or the like 54, only one of which is shown at FIG. 6 in the drawings. Each of said wooden support members 54 is provided with an L-shaped cut-out portion 55 in the upper surface thereof. Supported between the opposed cut-out portions of blocks 54, is a metal support tube 56 which spans the distance between the inner opposed ends of supports 54 in such a manner that there is an elongated slot formed between the upper face of bar 30 and support tube 56 along the central area of the side of the machine adjacent to the movable support 16. Beam 52 on one side and supports 54 and support tube 56 on the opposite side, have fixedly mounted thereon and spanning the distance therebetween, a transparent sheet 58 preferably made of Plexiglas but which may be made from glass or other similar transparent material. The only requirement to the construction of the sheet 58 is that it be transparent and penetrable to the X-rays.

Fixed to the upper surface of sheet 58 at spaced intervals along the side margins thereof, are a plurality of flange-receiving loop members 60. A pair of elongated side walls 62 and 64 are provided for securement to sheet 58 to extend upwardly therefrom perpendicular to the sheet 58. Adjacent the bottom margins of side walls 62 and 64 on the outwardly facing surface thereof and at spaced intervals therealong, are a plurality of fastening hooks 66 adapted to be complementarily received in the flange-receiving loop members 60. It can be seen that side walls 62 and 64 may be quickly and easily assembled to, and disassembled from sheet 58 by virtue of the requirement that the hooks 66 simply be moved into and out of engagement with the loop members 60 to complete the assembly process.

The inwardly facing surfaces of side walls 62 and 64 are provided with a lead lining or the like impenetrable to X-rays, thereby providing protection for the operators of the X-ray equipment. Each of side walls 62 and 64 is provided with a track 68 and 70 respectively, extending upwardly from the upper edge thereof for a purpose which will be hereinafter explained.

A support carriage 72 spans the distance between side walls 62 and 64. The support carriage 72 has a central opening 74 and is provided adjacent its side margins with a plurality of grooved caster wheels 76 which ride on the tracks 68 and 70 so that the support carriage 72 is movable along the tracks 68 and 70 over the table 12 and, more particularly, trough 26. The under surface of carriage 72 may be provided with a lead lining or the like impenetrable to X-rays.

Received in the central opening 74 is a pyramid-segment exposure area limiting assembly 78 having an upper narrow opening adapted, as shown in FIG. 1, to encompass the X-ray source, the assembly 78 extending downwardly through central opening 74 in engagement with the carriage 72 and extending slightly therebelow to hood the rays.

As shown in FIGS. 2 and 7 in particular, the assembly 78 may have its internal surface provided with a lead lining or the like impenetrable to the radiation of X-rays. As will be noted, particularly by referring to FIGS. 1 and 7 of the drawings, the pyramid-segment assembly 78 is provided with a pair of hinged diaphragm members 80 and 82 swingably connected to pyramid-segment 78 at the upper margins thereof as at 84 and extending to a termination approximately at the lower margins of pyramid-segment 78. It will be readily apparent that swinging the diaphragm members 80 and 82 toward and away from each other will control the exposure area of the X-rays, the diaphragm members 80 and 82 being impenetrable to X-ray radiation, thereby limiting the area within the range of pyramid-segment 78 that will be exposed to X-rays.

For this purpose, the diaphragm members 80 and 82 are coupled with pointer arms 86 and 88 respectively, mounted at one end on a plate 90. A pair of arc segment slots 92 and 94 are provided in the inclined surface 96 of pyramid-segment 78 facing toward the movable support 16. The hinged diaphragm members 80 and 82 are connected through the slots 92 and 94 with respective pointer arms 86 and 88. There is mounted on side 96 of pyramid-segment 78, a reversible prime mover 98 having a threaded output shaft 100 engaged with a threaded collar 102 secured to plate 90. There is further provided on side 96 of pyramid-segment 78, scales 102 and 104, each positioned relative to the slots 92 and 94 so that the ends of pointer arms 86 and 88 opposite to those secured to plate 90, may indicate thereon the opening of the exposure area which is selected by operating the reversible prime mover 98 to swing the diaphragm members 80 and 82 toward or away from each other.

The slot which is formed by bar 30, supports 54 and tube 56, is generally designated by the number 106. It should be noted at this point that the movable support 16 is provided with a pair of brackets 108 and 110, the bracket 108 coupling the support 16 with support carriage 72 and bracket 110 coupling the movable support 16 with frame 42 by means of a plate 112. On the plate 112 there is supported a reversible prime mover 114 having an output shaft 116 also extending through the slot 106, supported in a collar 118 and terminating in a worm gear 120. Worm gear 120 is in driving engagement with a gear 122 supported on a screw shaft 124 threaded oppositely from its ends to the center where the gear 122 is fixedly mounted, the screw-threaded shaft being threadably engaged with collars 126 and 128 on X-ray impenetrable shutters 48 and 50 respectively.

It will now be obvious that as the reversible prime mover 114 is driven, the plates 48 and 50 will slide with respect to frame 42 and along the track provided by the tabs 44 and 46 and the track flanges 38 and 40 to move between the solid and dotted line positions as shown in FIG. 3. Each of the plates 48 and 50 is provided with pointers 130 extending through the slot 106 and terminating in a downwardly directed point as best shown in FIG. 5. The exterior side surface of side bar 30 being provided with a scale 132 upon which the pointers 130, may indicate the position of the plates 48 and 50.

The side bar 30 is further provided with a rod 134 mounted thereon beneath the scale 132. A plurality of collars 136 of the type having thumbscrews 138, is provided on the bar 134 to be adjustably positionable therealong. A suitable switching apparatus 140, provided on bracket 110 immediately below plate 112, has a trip finger 142 coupled therewith and positioned as indicated in FIG. 3 to contact collars 136 as the support 16 and source 14 are tracked along the table 12. Thus, when the trip finger 142 is contacted and depressed by one of the collars 136, the switching mechanism 140 is actuated to operate the X-ray source 14 to take a picture. It can be seen from the foregoing description of the mechanism for spacing the plates 48 and 50, that by operating the motor 114, the plates 48 and 50 may be spread apart or brought together as desired to limit the exposure area of the X-ray source.

Referring now specifically to FIG. 6, it can be seen that the ends of the cassette supporting means 18 are provided with closure members 144 which may be used to close the end of the structure 18 by sliding the closure members 144 into abutting engagement with the ends of side bars 28 and 30 between the angle iron members 20 and 22 in the space provided. Closure member 144 also provides additional work space when pulled out. Further, the closure member 144, when in the position closing the end of the means for supporting the X-ray cassettes 18, has a U-shaped ring member 146 adapted to receive a hasp 148 to close and, if necessary, lock the member 144 as desired. It should be noted that the opposite end of the cassette supporting structure 18 may be provided with a similar closure member 144, the same not being shown in detail inasmuch as the structure is identical.

Referring now to FIGS. 8 and 9, there is shown several embodiments of cassettes generally designated by the figures 148 and 150. The cassettes 148 and 150 are adapted to receive and hold in the picture-taking position X-ray film disposed therein and may be of a variety of sizes and shapes, the only limitation on the cassettes 148 and 150 being that they be receivable in the trough 26 so that they may slide therethrough and be used in the picture-taking function.

In operation, the cassettes such as 36, or of the type 148 or 150 shown in FIGS. 8 and 9, may be slipped into the trough 26 on side flange members 32 and 34 and positioned by adding subsequent cassettes to push the previous one until the trough is completely filled with cassettes or until the cassettes are in the proper position. The X-ray source 14 and support 16 may then be moved along the length of the carriage 72 on the track provided by virtue of the tracks 68 and 70 and the grooved caster wheels 76, it being noted that shutter plates 48 and 50 will move with support 16 by virtue of their interconnection through plate 112. Each time the trip finger 142 contacts one of the stops or collars 136, the X-ray source 14 will be activated to take an X-ray picture. The aperture of the diaphragm may be selected by adjusting the diaphragm members 80 and 82 through reversible prime mover 98, screw shaft 100 and collar 118, to any desired measured opening as may be indicated on the scales 102 and 104 by the pointers 88 and 86. It requires only that the operator watch the motion of the pointers 86 and 88 to select any desired aperture, the same being quickly selected by the reversible prime mover 98.

It is further obvious that the over-exposure or accidental exposure of cassettes to the immediate side of the cassette holding the film it is desired to expose, may be prevented by adjusting the shutters 48 and 50 which are X-ray impenetrable to limit the exposure of the X-ray source 14 only to the area not covered by the shutters 48 and 50. The number of cassettes exposed in terms of the area to be opened to exposure can be selected by operating reversible prime mover 114 to drive the shaft 116, the worm 120 and the gear 122 and shaft 124 thereby to position the shutters as previously described.

The unit may be used in two manners, the first where the X-ray source 14 is stationary to take and retake pictures of the same area, the same being accomplished by sliding the cassettes in the trough by inserting a new one in one end and taking an exposed cassette from the other end so that there is always a fresh film and cassette beneath X-ray source 14.

The second manner of operation is where the trough is filled with cassettes of the type described and the source 14 and support 16 are passed along and over the table and the trip switch is used to take a series of pictures along the length of a person or object lying in the area defined by the transparent sheet 58 and the walls 62 and 64 so that a number of successive pictures along the length of the person or object may be taken.

The present type of X-ray accessory is particularly useful in situations where many exposures must be made in a short length of time, such as in an aortogram and similar X-ray examinations.

Having thus described the invention, what is claimed as new and desired to be secured by Letters Patent is:

1. In an accessory for an X-ray machine including an elongated table, an X-ray unit operably coupled with a power source, and a movable support coupled with said source of X-rays for supporting the latter in various positions along and overlying relationship to said table; means coupled with said table for supporting a plurality of X-ray film carrying cassettes along the longitudinal extent of said table, said means including a trough extending longitudinally thereof along which said cassettes are shiftable; and switching means adapted to be mounted on said movable support and operably coupled with said means for supporting said cassettes and said source of X-rays for actuating the latter at preselected intervals responsive to the movement of said source over the longitudinal extent of said table.

2. In an accessory for an X-ray machine including an elongated table, an X-ray source operably coupled with a power source, and a movable support coupled with said source of X-rays for supporting the latter in various positions along and overlying relationship to said table; elongated means coupled with and overlying said table for supporting a plurality of X-ray film carrying cassettes along the longitudinal extent of said table, said means including a trough extending longitudinally thereof along which said cassettes are shiftable; switching means adapted to be mounted on said movable support and operably coupled with said means for supporting said cassettes and said source of X-rays for actuating the latter at preselected intervals responsive to the movement of said source over the longitudinal extent of said table; and a pair of elongated, radiation-protective side walls coupled with said elongated means for supporting said cassettes along the side margins of said means and extending upwardly therefrom.

3. In an accessory for an X-ray machine including an elongated table, an X-ray source operably coupled with a power source, and a movable support coupled with said source of X-rays for supporting the latter in various positions along and overlying relationship to said table; elongated means coupled with and overlying said table for supporting a plurality of X-ray film carrying cassettes along the longitudinal extent of said table, said means including a trough extending longitudinally thereof along which said cassettes are shiftable; switching means adapted to be mounted on said movable support and operably coupled with said means for supporting said cassettes and said source of X-rays for actuating the latter at preselected intervals responsive to the movement of said source over the longitudinal extent of said table; a pair of elongated radiation-protective side walls coupled with said elongated means for supporting said cassettes along the side margins of the latter and extending upwardly therefrom; and radiation-protective exposure area limiting means coupled with said source of X-rays and the top margins of said side walls, said exposure area limiting means being shiftably coupled with said side walls for movement therealong.

4. The structure as set forth in claim 3, wherein said exposure area limiting means includes a diaphragm for controlling the exposure area, and means coupled with said diaphragm for selectively adjusting said diaphragm to increase and diminish the exposure area.

5. The structure as set forth in claim 3, wherein said switching means includes a plurality of adjustable trips in longitudinally spaced relationship on said means for supporting said cassettes and an X-ray source operating trip responsive switch coupled with said X-ray source, said trips and said switch being positioned on said elongated means for supporting said cassettes and on said movable support respectively whereby said switch engages said trips during movement of said support longitudinally of said table thereby selectively operating said X-ray source at preselected positions.

6. In an accessory for an X-ray machine including an elongated table, an X-ray source operably coupled with a power source, and a movable support coupled with said source of X-rays for supporting the latter in various positions along and overlying relationship to said table; elongated means coupled with and overlying said table for supporting a plurality of X-ray film carrying cassettes along the longitudinal extent of said table, said means including a first way extending longitudinally thereof along which said cassettes are shiftable and a second way extending longitudinally thereof above said first way in overlying relationship to said first way; a pair of radiation-impenetrable shutters shiftably supported in said second way; switching means coupled with said means for supporting said cassettes and said source of X-rays for actuating the latter at preselected intervals responsive to the movement of said source over the longitudinal extent of said table; a pair of elongated radiation-protective side walls coupled with said elongated means for supporting said cassettes along the side margins of the latter and extending upwardly therefrom; radiation-protective exposure area limiting means adapted to be coupled with said source of X-rays for mounting the latter above said means for supporting said cassettes, said limiting means being in engagement with the top margins of said side walls and shiftably coupled therewith for movement therealong; and reversible positioning means coupled with said shutters and said X-ray source support for selectively positioning said shutters.

7. The structure as set forth in claim 6, wherein said means for supporting a plurality of cassettes includes an elongated bottom having a central elongated cassette supporting trough and elongated side flanges; a pair of elongated sides supported by said flanges, a transparent elongated top supported by said sides in overlying, covering relationship to said trough bottom; and a pair of elongated, parallel trough flanges supported by said bottom intermediate said trough bottom and said top for shiftably supporting a pair of radiation-impenetrable shutters, said side walls being disposed on and extending upwardly from said transparent top.

8. The structure as set forth in claim 6, wherein said radiation-protective exposure area limiting means coupled with said source of X-rays includes a hollow pyramid segment coupled with said source of X-rays; a pair of radiation-impenetrable diaphragm members housed within said pyramid segment and swingably coupled thereto adjacent said source of X-rays; and reversible setting means coupled with said diaphragm members for selectively varying the distance between said diaphragm members.

References Cited in the file of this patent

UNITED STATES PATENTS

| | | |
|---|---|---|
| 1,239,146 | Wantz | Sept. 4, 1917 |
| 2,579,186 | Haboush | Dec. 18, 1951 |
| 2,617,943 | Marks et al. | Nov. 11, 1952 |
| 2,617,944 | Perez | Nov. 11, 1952 |
| 2,722,611 | Haupt | Nov. 1, 1955 |
| 2,790,907 | Graves | Apr. 30, 1957 |
| 2,832,893 | Camardella | Apr. 29, 1958 |
| 2,835,824 | Schepker | May 20, 1958 |
| 2,888,567 | Land | May 26, 1959 |
| 2,921,202 | Berger et al. | Jan. 12, 1960 |